Patented Aug. 7, 1951

2,563,005

UNITED STATES PATENT OFFICE 2,563,005

ORGANOPOLYSILANE RESINS

Harold A. Clark, Midland, Mich., assignor to Dow Corning Corporation, Midland, Mich., a corporation of Michigan No Drawing. Application June 15, 1949, Serial No. 99,338

4 Claims. (Cl. 260—2)

The present invention relates to organopolysilane resins and to their production.

In the organosilicon industry the resins which have become of substantial importance are organopolysiloxanes. These resins are of substantial importance due to their great thermostability as compared to previous organic type resins.

In the past a slight amount of work has been done with polysilanes. In particular, Kipping prepared a polysilane from diphenyldichlorosilane. The polysilane which was obtained was apparently heterogeneous in character and of no apparent commercial utility. In particular, the product obtained appears not to have been resinous in character.

Resins in accordance with the present invention are polysilanes in which the silicon atoms in the molecules thereof are interconnected and the remaining valences of the silicon atoms are satisfied by phenyl and methyl radicals. In these resins there are from 1.2 to 2, inclusive, total phenyl and methyl radicals per silicon atom. Between 20 and 70 percent of the total phenyl and methyl radicals are phenyl radicals. In accordance with the method hereof these resins are prepared by the interaction of phenyl and methyl substituted silicon chlorides with an alkali metal. The silicon chloride mixture obtained is one which has the average formula $(CH_3)_n(C_6H_5)_mSiCl_{4-n-m}$ in which $n+m$ has a value of from 1.2 to 2, inclusive, and $$\frac{m}{n+m}$$

has a value from 0.2 to 0.70.

Suitable silanes for the preparation of the polysilane resins hereof are such materials as methyltrichlorosilane, phenyltrichlorosilane, phenylmethyldichlorosilane, diphenyldichlorosilane, dimethyldichlorosilane, triphenylchlorosilane, diphenylmethylchlorosilane, phenyldimethylchlorosilane and trimethylchlorosilane. These materials, or any desired ones thereof, may be employed and proportioned in such relative amounts as to provide mixtures of the defined character. It is preferred to employ silanes each of which has at least one phenyl radical bonded to the silicon atom. This is desirable inasmuch as these silanes which carry a phenyl radical are higher boiling than the methyl silanes, which makes operation somewhat more easy.

The organochlorosilane mixture as above defined is interacted with the alkali metal. The alkali metal may be any of the well known alkali metals such as sodium, potassium, caesium or rubidium. Likewise, the sodium-potassium eutectic may be employed. It is preferred due to commercial availability, however, to employ either sodium or potassium.

For rapid rate of reaction it is desirable to have the alkali metal in a finely divided state. The alkali metal may conveniently be molten alkali metal dispersed in a diluent such as an aliphatic or aromatic hydrocarbon solvent. Likewise, a fine dispersion of the alkali metal in solid form in such a diluent may be employed. Such dispersions are known in the art. Alternatively, the alkali metal may be employed in the form of wire or small cut pieces. The temperature at which the reaction is conducted is not critical. However, in order to obtain rapid rate of reaction it is desirable to employ temperatures in excess of about 50° C. The reaction which is exothermic can conveniently be operated under reflux whereby the heat of reaction is dissipated by the cooling of refluxing solvent. In larger scale operation, as is well known in mechanical engineering, the heat of reaction may be dissipated by indirect heat exchange. The reaction is normally conducted at temperatures below 200° C. due to increasing danger at the elevated temperatures with the reactants which are employed. The silanes are maintained in liquid phase during the course of the reaction.

The reaction may be conducted either by adding the alkali metal to the organochlorosilanes or by adding the mixture of the organochlorosilanes to a dispersion of the alkali metal.

Following reaction of the organochlorosilanes and the alkali metal the product may be purified to separate it from the salt which is by-produced and from any residual alkali metal. This purification may be effected by conventional procedures such as filtering, washing with alcohol to react with the alkali metal, and washing with water.

The polysilane resins so produced are of unexpected and outstanding properties. They are thermoplastic and may be applied to surfaces to be coated either in solution in organic solvents such as petroleum naphtha or they may be employed in melted state free of solvent. The coating so applied is tack-free at room temperature. The resin thus applied as a coating may be thermally set by heating with the resin exposed to air or other inert gas such as nitrogen or flue gas. The uncured film is quite hard but lacks toughness. Following curing the hardness is retained and the film acquires great toughness and durability. It is very resistant to scratching. Furthermore, the resin films so applied have excellent electrical insulating properties. These cured resins are likewise resistant to softening by organic solvents and are not deteriorated by water. They have a flow point when coated on magnet wire of about 250° C. and above as compared with flow points of about 175° C. for the siloxane resins. This combination of properties makes these resins of great utility in electrical insulating applications.

The resins hereof in the thermoplastic state are of utility as thermoplastic molding compositions. In deep section, they retain their thermoplastic properties even at relatively high temperature below their melting point for long periods of time.

The presently available commercial siloxanes cannot be concentrated to 100% solids and then redissolved in such a form as to obtain comparable properties to the siloxane which has not been concentrated to 100% solids. The present polysilane resins may be concentrated to 100%. Upon again dissolving these polysilane resins the properties thereof are identically the same as before concentration to 100% solids. This property of the present resins makes it possible to ship the organosilicon resin free of solvent and thereby effects substantial savings in shipping costs. The saving is reflected not only in that it is not necessary to ship solvent but also in that the resin may be shipped as a dry solid in a fiber drum rather than in a drum designed for containing flammable liquids. This factor is of extreme importance in foreign shipments.

*Example 1*

1536 parts by weight of $CH_3C_6H_5SiCl_2$ were added gradually to 286.34 parts of sodium in 2598 parts of dry toluene under reflux. The reaction mixture was refluxed until no chlorides were present. The reaction mixture was then filtered and washed with hot toluene. The product was next stripped of toluene. This polysilane resin, the polymer units of which had the formula $CH_3C_6H_5Si=$, softens at 120° C., and melts at 223° C. The molecular weight of this polymer was found to be about 30,000. A toluene or xylene solution of this polymer deposited films which were tack-free at room temperature and which were converted to a hard, tough resinous film by heating for three hours at 250° C. in contact with air.

*Example 2*

50.6 parts by weight of small pieces of solid sodium were added gradually to 192 parts of $CH_3C_6H_5SiCl_2$ in refluxing dry toluene. The reaction was slow in starting. The mixture was refluxed for 3 hours, and isopropanol then added to destroy residual sodium. After this, the reaction mixture was washed with dilute HCl. The organic layer was separated, neutralized, dried and filtered. The product was next stripped of toluene. The thermoplastic material so obtained and composed of $CH_3C_6H_5Si=$ polymer units would become an insoluble resin upon heating a film thereof in contact with air.

*Example 3*

A mixture of 64.5 parts by weight of $(CH_3)_2SiCl_2$ and 95.5 parts of $CH_3C_6H_5SiCl_2$ was gradually added to 50.6 parts of molten metallic sodium suspended in 800 parts of dry xylene. The reaction mixture was refluxed until the reaction appeared to be substantially complete, following which it was filtered, washed and stripped of xylene. This product was a tough rubbery thermoplastic resin. Toluene or xylene solutions deposited a tack free rubbery film which could be cured to a hard resinous film at elevated temperatures.

*Example 4*

A mixture of 143.25 parts by weight of $CH_3C_6H_5SiCl_2$ and 32.2 parts of $(CH_3)_2SiCl_2$ was added to 50.6 parts of molten metallic sodium dispersed in 512 parts of dry toluene. The reaction mixture was refluxed until the reaction appeared to be complete following which the excess sodium was destroyed by the addition of alcohol and the product filtered and washed. The toluene solution so obtained would cure to a hard, tough resin upon heating a film coating thereof on a metal panel.

*Example 5*

A mixture of 64.5 parts by weight of $(CH_3)_2SiCl_2$ and 126.5 parts of $(C_6H_5)_2SiCl_2$ was added gradually to 50.6 parts of molten metallic sodium in 385 parts of dry toluene. The reaction was conducted and the product worked up as in Example 1. The product was a hard thermoplastic resin which would set to a hard, tough film on heating a film in contact with air.

*Example 6*

A mixture of 63.7 parts by weight of $CH_3C_6H_5SiCl_2$ 70.5 parts of $C_6H_5SiCl_3$ and 56.9 parts of $(CH_3)_2C_6H_5SiCl$ was added to a suspension of 48 parts of sodium in 480 parts of refluxing toluene. The silane mixture was added gradually during a period of one hour. The mixture was then refluxed for an additional hour. Sodium in the amount of 2 parts was then added to provide free sodium for reaction with residual chloride. Refluxing was continued until the polysilane was free of chloride. The product was then cooled to 75 to 80° C. and filtered. This resin would produce an exceptionally tough, hard film upon heating in contact with air. When applied to copper wire and cured by heating, no discoloration of the copper by oxidation will be observed.

*Example 7*

A mixture of 171.7 parts by weight of $CH_3C_6H_5SiCl_2$ and 15 parts of $CH_3SiCl_3$ was added to 50 parts of sodium dispersed in 480 parts of refluxing toluene. The resin in this instance was processed and finished as in Example 6. The resin was coated on a panel. It air dries to a hard tack-free film. This coating was cured to a thermoset resin by heating for three hours at 250° C. The coating was then hard and tough, yet sufficiently flexible that the panel could be bent over a one-half inch mandrel without breaking the resin. This cured film was unaffected by soaking in water overnight. It did not develop on such soaking an opalescent appearance. It was not substantially softened by organic solvents.

*Example 8*

A mixture of 105.7 parts by weight of $C_6H_5SiCl_3$ and 95.5 parts of $C_6H_5CH_3SiCl_2$ was added to 60 parts of sodium dispersed in refluxing toluene.

The reaction mixture was processed and worked up as in Example 6. A solution of the resin so produced air dries to a very hard tack-free film and may be cured by heating to a hard, tough resin.

*Example 9*

A mixture of 143.25 parts by weight of $CH_3C_6H_5SiCl_2$ and 63.25 parts of $(C_6H_5)_2SiCl_2$ was added to a suspension of 48 parts of sodium in 406.5 parts of refluxing toluene. The chlorosilane mixture was gradually heated over a period of one hour. The mixture was then refluxed for an additional hour. Sodium in amount of two parts was then added to provide free sodium for reaction with residual chloride. Refluxing was then continued until the polysilane was free of chloride. The product was then filtered. The resultant product was a thermoplastic resin tack-free upon air drying, which would set to a hard tough film upon heating in contact with air. This resin is suitable as a thermoplastic material in which to embed electrical coils such as transformers.

*Example 10*

A mixture of 160 parts by weight of $C_6H_5CH_3SiCl_2$ 30 parts of $C_6H_5SiCl_3$ and 10 parts of $C_6H_5(CH_3)_2SiCl$ were added to a suspension of 52 parts of molten sodium in 480 parts of refluxing toluene. The addition time was 1¼ hours. The mixture was then refluxed for an additional hour. Three parts of sodium were then added to provide free sodium for reacting with the residual chloride. The mixture was then refluxed for an additional 18 hours. Twenty-five cc. of methanol were added to the mixture to kill the excess sodium. The reaction mixture was next washed with 500 cc. of water. The excess alkali was next neutralized with 10 per cent $H_2SO_4$. The organic layer was separated and 716 parts of a clear solution of polymer were obtained. This polymer is a resin which will cure in 2½ hours at 250° C. to a hard, tough, flexible film.

*Example 11*

162.25 parts by weight of $C_6H_5CH_3SiCl_2$ and 31.75 parts of $C_6H_5SiCl_3$ were added to a suspension of 52 parts of sodium in 460 parts of refluxing toluene. The addition time was 1¼ hours. The mixture was then refluxed for an additional 45 minutes. Three parts of sodium were then added to provide free sodium for reacting with the residual chloride. The reaction mixture was next filtered and the resulting solution concentrated to 32.7% solids. This polymer cures to a hard tough resin upon heating.

*Example 12*

A mixture of 200.5 parts by weight of $C_6H_5CH_3SiCl_2$ 31.6 parts of $C_6H_5SiCl_3$, 22.5 parts of $CH_3SiCl_3$ and 25.5 parts of $(CH_3)_2SiCl_2$ was gradually added to a suspension of 75 parts of sodium in 674 parts of refluxing toluene. The addition time was one hour and 15 minutes. The reaction mixture was then refluxed for 21 hours.

The product was next filtered and the filtrate treated with 20 parts of $NaHCO_3$ and 71.4 parts of wet ether to remove the last traces of chloride. The filtrate was next concentrated to 225 C./45 mm. The product was dissolved in a mixed aromatic solvent. A resin solution of the product deposited a film which air dries tack free. The resin may be cured at elevated temperatures to a hard tough film.

If desired, in the above examples, catalysts may be employed to increase the rate of setting, or to lower the temperature required to bring about setting of the resins.

That which is claimed is:

1. Organopolysilane resins in which the silicon atoms in the molecules thereof are interconnected by substantially only silicon to silicon bonding, the remaining valences of the silicon atoms being satisfied by phenyl and methyl radicals, which resin contains from 1.2 to 2, inclusive, total phenyl and methyl radicals per silicon atom and in which resin between 20 and 70 per cent of such total phenyl and methyl radicals are phenyl radicals.

2. An organopolysilane resin in which the silicon atoms in the molecules thereof are interconnected, by substantially only silicon to silicon bonding, each silicon atom thereof having two valences satisfied by hydrocarbon radicals, one being satisfied by a phenyl radical and the other by a methyl radical.

3. Organopolysilane resins in which the silicon atoms in the molecules thereof are interconnected, by substantially only silicon to silicon bonding, the remaining valences of the silicon atoms being satisfied only by phenyl and methyl radicals which resin contains between 1.2 and 2 total phenyl and methyl radicals per silicon atom, at least 40 per cent of the silicon atoms having bonded thereto only one phenyl and one methyl radical, and the remainder of the silicon atoms having bonded thereto only one phenyl radical.

4. Organopolysilane resins in which the silicon atoms in the molecules thereof are interconnected by substantially only silicon to silicon bonding, the remaining valences of the silicon atoms being satisfied only by phenyl and methyl radicals, which resin contains between 1.2 and 2 total phenyl and methyl radicals per silicon atom, at least 40 per cent of the silicon atoms having bonded thereto only one phenyl and one methyl radical, and the remainder of the silicon atoms having bonded thereto only one methyl radical.

HAROLD A. CLARK.

REFERENCES CITED

The following references are of record in the file of this patent:

UNITED STATES PATENTS

| Number | Name | Date |
|---|---|---|
| 2,410,346 | Hyde | Oct. 29, 1946 |
| 2,483,972 | Goodwin | Oct. 4, 1949 |

OTHER REFERENCES

Kipping et al.: Jour. Chem. Soc., London, vol. 119, pp. 830–837 (1921).

Palmer et al.: Proc. J. Chem. Soc., London (1930), pp. 1020 to 1028.

Burkhard: Jour. Amer. Chem. Soc., vol. 71, March 1949, pp. 963 and 967.